United States Patent [19]
Cattelain et al.

[11] Patent Number: 5,109,634
[45] Date of Patent: May 5, 1992

[54] METHOD AND APPARATUS FOR MACHINING CENTERING CHAMFERS

[75] Inventors: Camille M. Cattelain, Franconville; Francis Girard, Viroflay, both of France

[73] Assignee: Societe anonyme dite Hispano-Suiza, Saint-Cloud, France

[21] Appl. No.: 664,803

[22] Filed: Mar. 5, 1991

Related U.S. Application Data

[62] Division of Ser. No. 352,986, May 17, 1989.

[30] Foreign Application Priority Data

May 17, 1988 [FR] France .................. 88 06590

[51] Int. Cl.⁵ ............................ B24B 5/08
[52] U.S. Cl. ................... 51/237 R; 51/227 R; 51/277
[58] Field of Search .............. 51/277, 290, 236, 237, 51/217 T, 227 R

[56] References Cited

U.S. PATENT DOCUMENTS

| | | | |
|---|---|---|---|
| 2,417,409 | 3/1947 | Garrison | 51/217 T |
| 4,858,393 | 8/1989 | Yamada | 51/227 R |

FOREIGN PATENT DOCUMENTS

| | | |
|---|---|---|
| 1290843 | 3/1969 | Fed. Rep. of Germany . |
| 2242738 | 3/1974 | Fed. Rep. of Germany . |
| 0259337 | 12/1985 | Japan . |

Primary Examiner—Robert A. Rose
Attorney, Agent, or Firm—Bacon & Thomas

[57] ABSTRACT

A method and apparatus are disclosed for determining a reference axis for a gear shaft about which the centering chamfers may be formed to facilitate the final machining of the remaining elements on the gear shaft. The invention includes the attachment of rolling path elements to either end of the shaft such that their positions may be laterally adjusted with respect to the shaft. A mandrel is located within the gear shaft and may extend from either end thereof. The assembly is placed in a rotatable device such that it is rotated about the longitudinal axis of the mandrel. While rotating, the positions of the rolling path elements are laterally adjusted such that their centers are coincident with the rotational axis. The mandrel is then withdrawn and the gear shaft, with the rolling path elements still attached is placed in a grinding or dressing machine such that it is supported and rotated by the rolling path elements so as to rotate about their centers. The chamfer is finished machined as the device rotates.

3 Claims, 7 Drawing Sheets methods and apparatus for machining centering chamfers

METHOD AND APPARATUS FOR MACHINING CENTERING CHAMFERS

This application is a division, of application Ser. No. 07/352,986, filed May, 17, 1989.

BACKGROUND OF THE INVENTION

The present invention relates to a method and apparatus for machining centering chamfers on gear shafts by establishing a reference axis and subsequently machining the shaft by rotating it about this axis.

The method and apparatus find particular application in the manufacture of gear shafts having a gear wheel extending generally laterally from the shaft. The manufacture of such elements, particularly for aeronautical usage, entails rigorous accuracy and quality. It is conventional practice to provide an inner chamfer at each end of the gear shaft to act as a center for the shaft about which the shaft and gear rotate.

It is also typical to subject the gear shaft to a heat treatment after forming the shaft and the gear. The heat treatment usually causes slight deformations in the shaft and the gear teeth, known in the art as offsets and warps.

Consequently, it is necessary to subject the gear shaft to further machining operations to rework the centers machining to tight tolerances the rolling supports and the gear teeth.

SUMMARY OF THE INVENTION

The present invention relates to a method and apparatus for determining a reference axis for the gear shaft about which the centering chamfers may be formed to facilitate the final machining of the remaining elements on the gear shaft.

The invention includes the attachment of rolling path elements to either end of the shaft such that their positions may be laterally adjusted with respect to the shaft.

A mandrel is located within the gear shaft and may extend from either end thereof. The assembly is placed in a rotatable device such that it is rotated about the longitudinal axis of the mandrel. While rotating, the positions of the rolling path elements are laterally adjusted such that their centers are coincident with the rotational axis.

The mandrel is then withdrawn and the gear shaft, with the rolling path elements still attached is placed in a grinding or dressing machine such that it is supported and rotated by the rolling path elements so as to rotate about their centers. The chamfer is finished machined as the device rotates. Once the chamfers have been fully machined, the rolling path elements may be removed and the chamfers utilized as a centering device for the finished machining of the remainder of the gear shaft.

BRIEF DESCRIPTION OF THE DRAWINGS

FIG. 3 is a schematic diagram showing the gear shaft and the rolling path elements to compensate for a lateral offset of the gear shaft.

FIGS. 3b and 3c are vector diagrams illustrating the determination of the lateral distances the rolling path elements are to be offset to compensate for the gear shaft offset in FIG. 3a.

FIG. 5a is a longitudinal cross sectional view showing the mandrel installed in the assembly shown in FIG. 4a.

DETAILED DESCRIPTION OF THE PREFERRED EMBODIMENT

Figure 1:
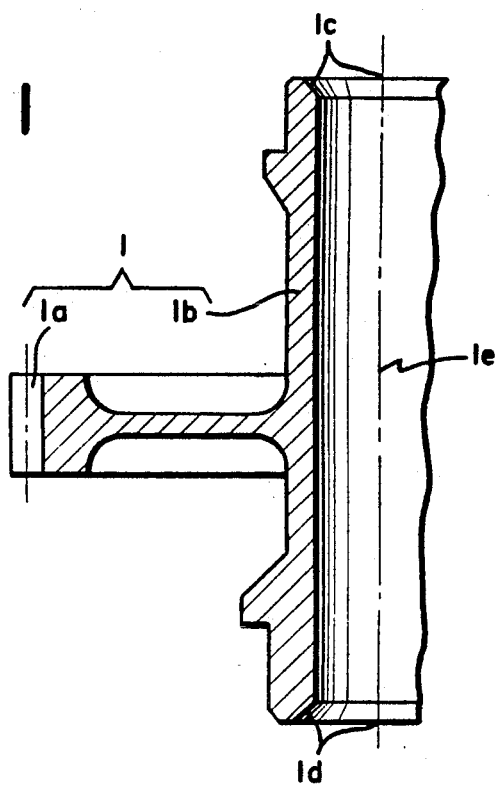
FIG. 1 is a partial, longitudinal sectional view of a gear shaft formed according to the method and apparatus of the invention.

The gear shaft manufactured according to the present invention is shown in FIG. 1 and comprises a gear wheel section 1a extending laterally from a generally cylindrical shaft portion 1b. Each end of the shaft portion 1b has a centering chamfer 1c and 1d formed thereon. The centering chamfers define the rotational axis 1e which passes through the centers of the chamfers 1c and 1d.

Figure 2:
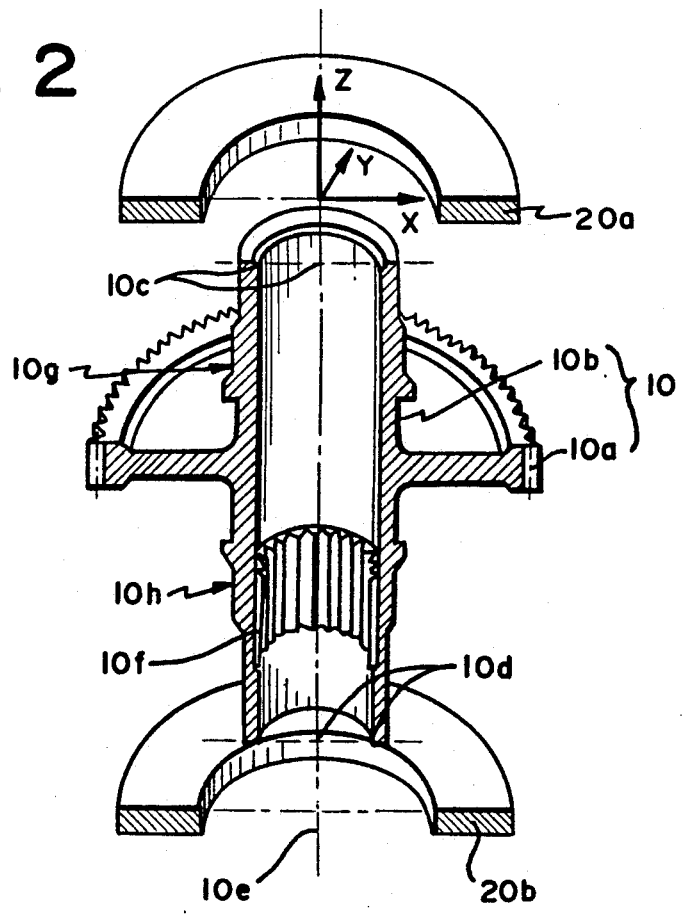
FIG. 2 is a perspective schematic diagram showing the reference axis and the rolling path elements associated with the gear shaft.

FIG. 2 schematically illustrates the establishment of a reference axis by use of the rolling path elements in order to accurately form the centering chamfers 1c and 1d about this axis. As illustrated, gear shaft 10 comprises gear portion 10a, shaft portion 10b and centering chamfers 10c and 10d analogous to that shown in FIG. 1. Gear shaft 10 also comprises an internally splined section 10f as well as two cylindrical, external bearing portions 10g and 10h. Rolling path elements 20a and 20b are attached to each end of pinion shaft 10 so as to be movable in a lateral plane xy with respect to the gear shaft. As discussed in more detail below, such lateral displacements of the rolling path elements allow a reference axis 10e to be established which passes through the centers of the rolling path elements 20a and 20b.

Figure 3A:
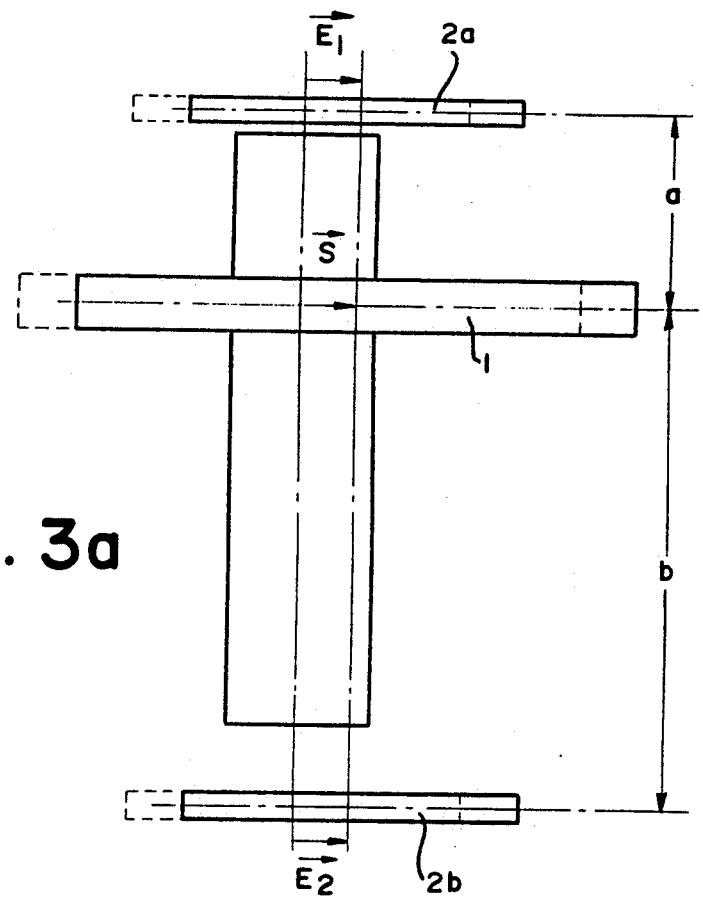

The positions of the rolling path elements may be individually adjusted to determine a reference axis that compensates for and takes into account the geometric defects of the gear shaft such as the offset or warp of the gear itself, characteristics which are ascertained by any conventional means. FIG. 3a schematically illustrates a gear portion 1 having a measured offset denoted by the vector S. The correction relative to the reference axis is made by displacing the two rolling path elements 2a and 2b by the vector quantities $\vec{E}_1$ and $\vec{E}_2$, respectively.

Figure 3B:
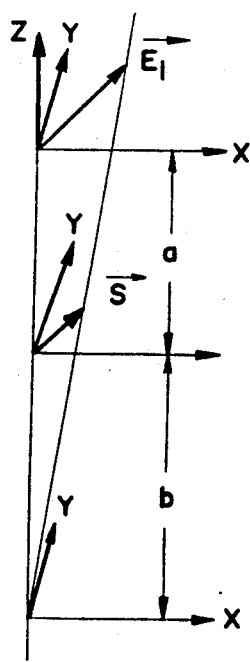
Figure 3C:
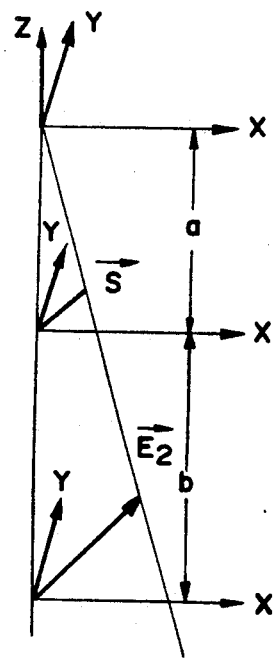

If it is assumed that a and b are, respectively, the distances from the center of the gear to the centers of the rolling path elements 2a and 2b, the geometric relationships under consideration may be stated, in relation to the vector diagrams shown in FIGS. 3b and 3c, as follows:

the effect of eccentricity $E_1$ on the offset is given by:

$$\vec{S}=[1-a/(a+b)]\vec{E_1}$$

and the effect of an eccentricity $\vec{E_2}$ is given by:

$$\vec{S}=[a/(a+b)]\vec{E_2}$$

while the combined effect of the two eccentricities is given by:

$$\vec{S}=[1-a/(a+b)]E_1+[a/(a+b)]E_2.$$

Figure 3D:
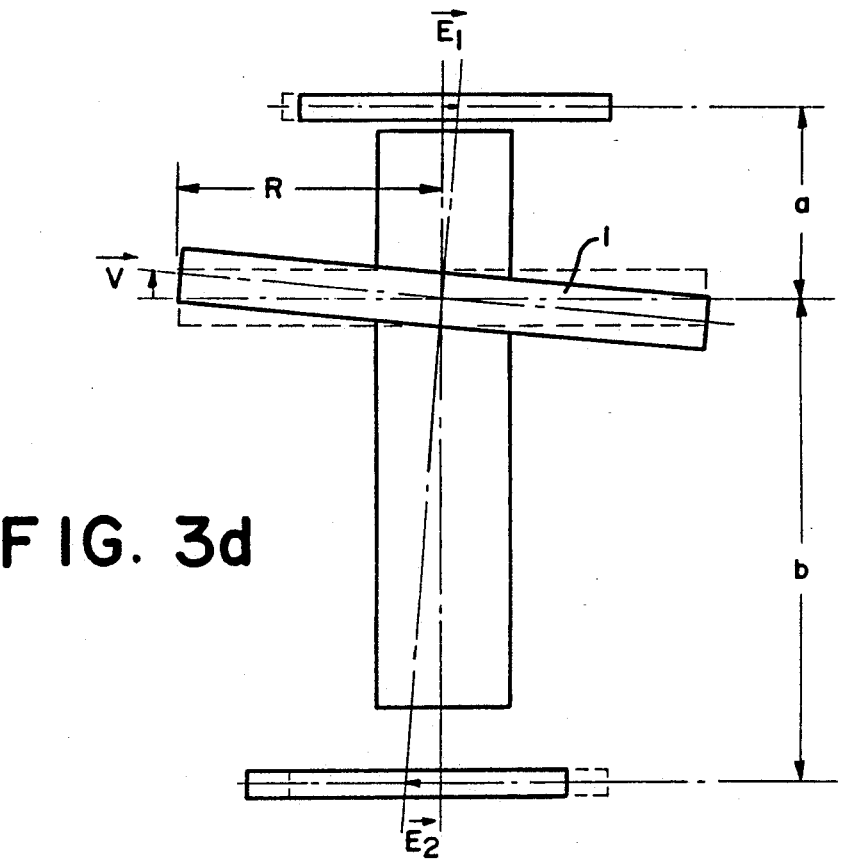
FIG. 3d is a schematic diagram showing a gear shaft and the rolling path elements to compensate for a warped gear shaft.
Figure 3E:
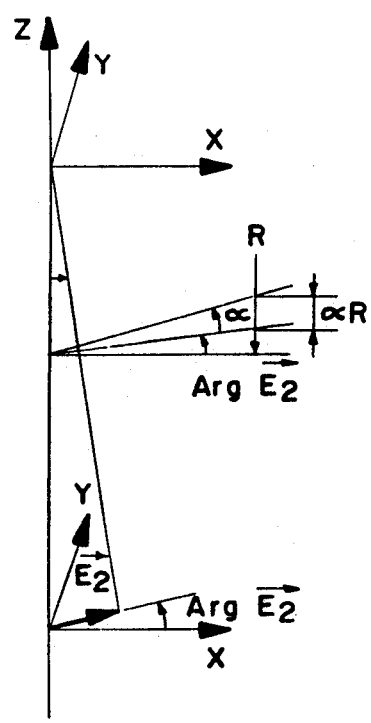
FIGS. 3e and 3f are vector diagrams illustrating the determination of the lateral offset values for the rolling path elements of FIG. 3d.
Figure 3F:
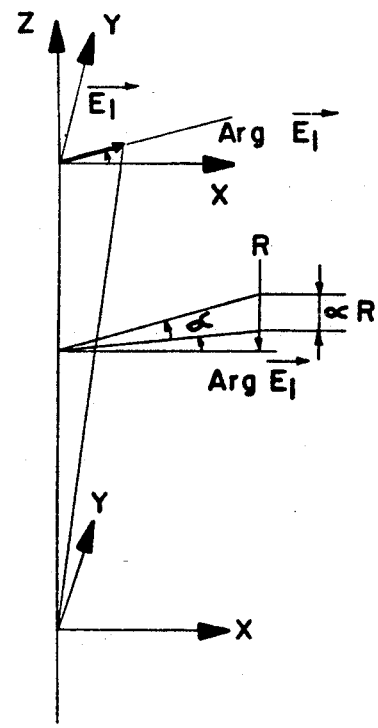

FIG. 3d schematically illustrates a gear shaft whose gear is warped or angularly displaced with respect to the shaft portion. The displacement of the rolling path elements 2a and 2b necessary to correct for this warp is denoted by the vectors $\vec{E_1}$ and $\vec{E_2}$ which are applied in this case as a function of V, the radius of the gear R and of the distances a,b between the respective centers of the rolling path elements and the center of the gear. These relationships are illustrated in FIGS. 3e and 3f.

Let $\alpha$ be the angle by which the pinion is slanting, then $|\vec{V}|=R \propto \alpha$ and if the eccentricity is $\vec{E_2}$:

$$Arg\ \vec{V}=Arg\ \vec{E_2}\cdot|\vec{E_2}|=\alpha(a+b)$$

or $\vec{V}=[R/(a+b)]\vec{E_2}$ and similarly $$\vec{V}=[-R/(a+b)]\vec{E_1}$$

and the combined effect of the two eccentricities is given by $$\vec{V}=[-R/(a+b)]\vec{E_1}+[R/(a+b)]\vec{E_2}.$$

Figure 3G:
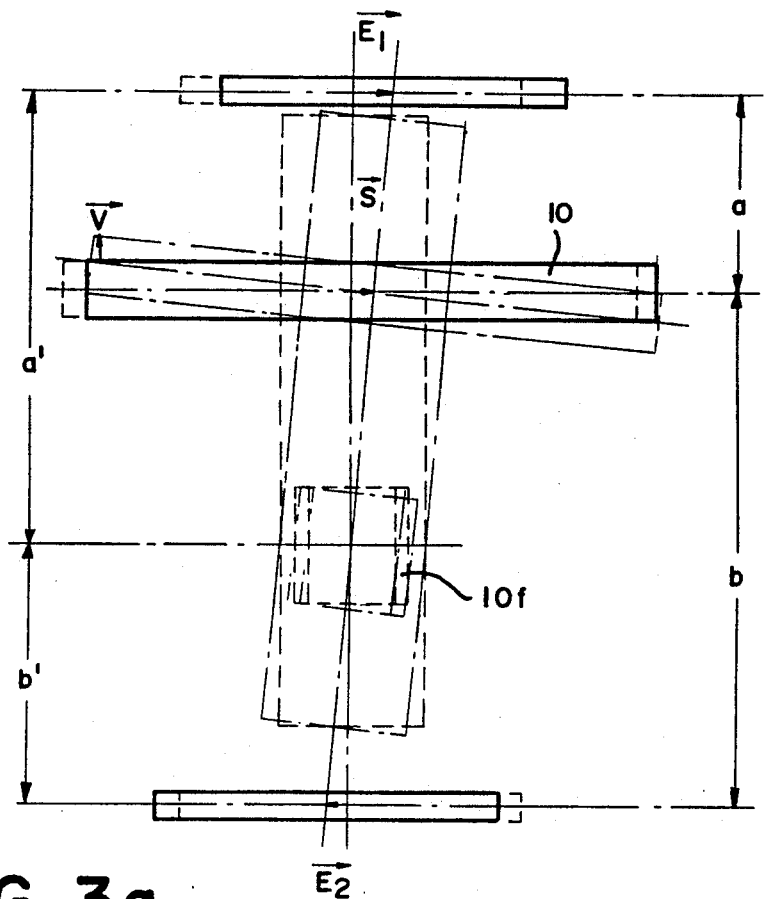
FIG. 3g is a schematic diagram of a warped gear shaft having an internally splined section and illustrating the lateral offset of the rolling path elements.

In the case illustrated schematically in FIG. 3g, the gear shaft 10 also comprises a set of internal splines 10f. In this instance, it is further necessary that the reference axis pass through the center of the splined section 10f. a' and b' represent the respective distances between the center of spline section 10f and the centers of the rolling path elements 2a and 2b. The thermo-chemical treatment to which the article is subjected in this instance calls for slight bonding thickness of the splines 10f and, therefore, dressing or machining will be minimal.

In this instance, the equations defining the reference axis are:

$$\vec{S}=[b/(a+b)]\vec{E_1}+[a/(a+b)]\vec{E_2}$$

$$\vec{V}=[R/(a+b)]\vec{E_1}-[R/(a+b)]\vec{E_2}$$

$$\vec{S'}=[b'/(a'+b')]\vec{E_1}+[a'/(a'+b')]\vec{E_2}.$$

Since the reference axis must pass through the center of the internal spline, it follows $|\vec{S'}|=0$.

Consequently, the offset-reduction may entail an increase in warp, and similarly, a reduction in the warp may entail an increase in the offset, as originally found.

By substituting $a+b=a'+b'=c$, the above set of equations becomes:

$$|\vec{S}-(b/c)\vec{E_1}-(a/c)\vec{E_2}|<S_0$$

$$|\vec{V}-(R/c)\vec{E_1}-(R/c)\vec{E_2}|<V_0$$

$$(b'/c)\vec{E_1}+(a'/c)\vec{E_2}=2$$

or $\vec{E_2}=(-b'/a')\vec{E_1}$ and $|\vec{S}-\vec{E_1}[(b/c)-(ab'/ca')]|<S_0$ substituting $$K=(ba'-ab')/ca'$$

$$|\vec{S}-K\vec{E_1}|<S_0$$

and similarly $$|\vec{V}-\vec{E_1}(R/c)(1-b'/a')|<V_0$$

and by setting $$L=(R/c)(1-b'/a')$$

$$|\vec{V}-L\vec{E_1}|<V_0.$$

Let the function $f(x_1,y_1)=$ square of residual offset $+\lambda=$ square of the residual warp be a minimum.

Then $f(x_1,y_1)=|\vec{S}-K\vec{E_1}|^2+\lambda|\vec{V}-L\vec{E_1}|^2$ or $f(x_1,y_1)=(x_s-Kx_1)^2+(y_s-ky_1)^2+\lambda(x_v-Lx_1)^2+\lambda(y_v-Ly_1)^2$ A minimum is obtained when: $\partial f(x_1,y_1)/\partial x_1-0$ $\partial f(x_1,y_1)/\partial y_1=0$, that is, $\partial f/\partial x_1=-2K(x_s-Kx_1)-2L\lambda(x_v-Lx_1)=0$, whence $x_1=(Kx_v+\lambda Lx_v)/(K^2+\lambda L^2)$.

Similarly, $\partial f/\partial y_1=-2K(y_s-Ky_1)-2L\lambda(y_v-Ly_1)=0$, whence $y_1=(Ky_s+\lambda Ly_v)/(K^2+\lambda L^2)$ and $$\vec{E_1}=(1/[K^2+\lambda L^2])\times(K\vec{S}+L\vec{V})$$

$$\vec{E_2}=(-b'/a')(1/[K^2+\lambda L^2])\times(K\vec{S}+\lambda L\vec{V})$$

The coefficient $\lambda$ determines the significance of the warp criterion relative to that of the offset. Thus, if $\lambda=1$, the warp and offset are considered equally significant, while if $\lambda=$zero, the warp is neglected.

Figure 3H:
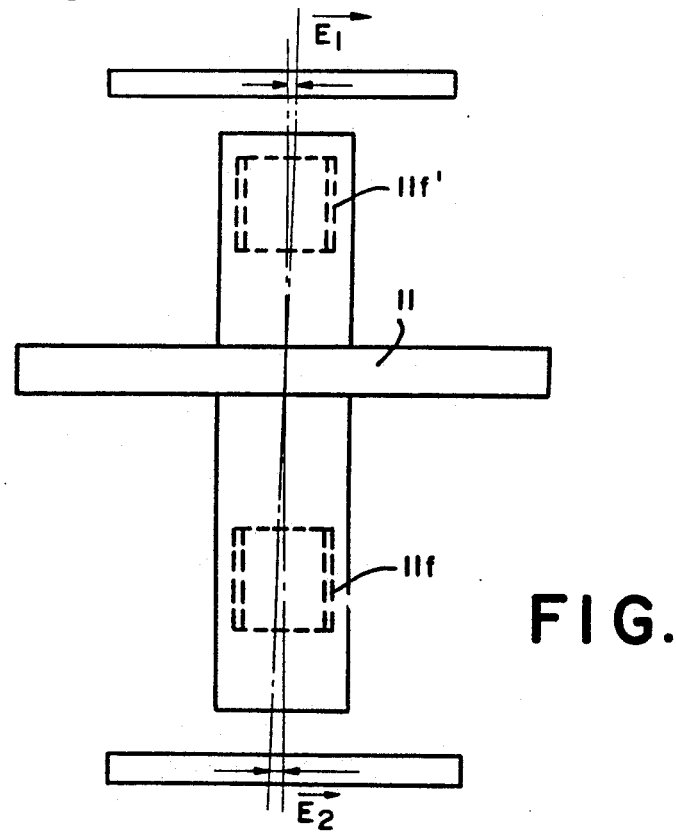
FIG. 3h is a schematic diagram of a gear shaft having a pair of internally splined sections and illustrating the positioning of the rolling path elements.

In this case of a gear shaft 11 such as that schematically illustrated in FIG. 3h, having two sets of internal splines 11f and 11f', the reference axis is defined as above for a gear shaft having no internal splines as discussed in relation to FIGS. 3a through 3f. A maximum eccentricity is imposed by the internal spline in light of the permissible grinding of their thicknesses, which is taken into account by the defined reference axis.

Figure 4:
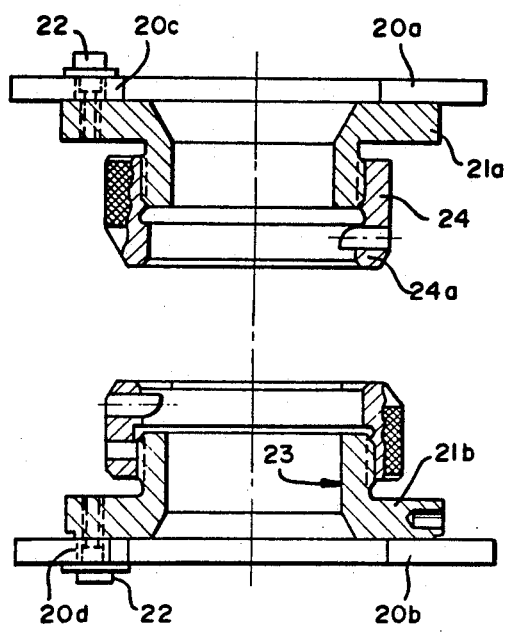
FIG. 4 is a cross sectional view of the rolling path elements and the means to attach the elements to the gear shaft.
Figure 4A:
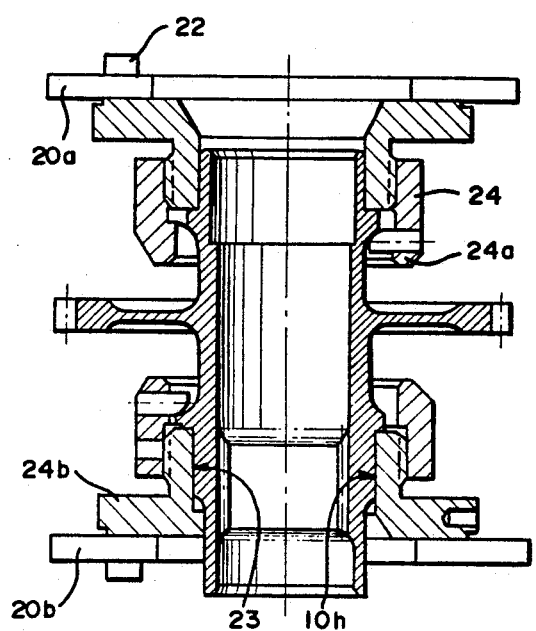
FIG. 4a is a longitudinal cross sectional view showing the elements of FIG. 4 attached to a gear shaft.
Figure 5:
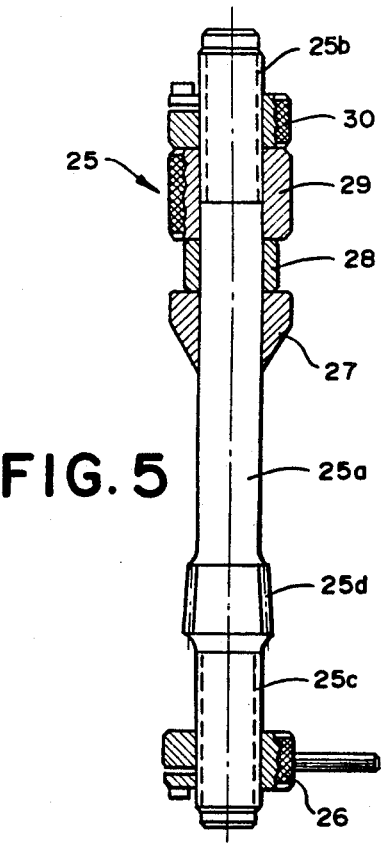
FIG. 5 is a longitudinal, sectional view of the mandrel according to the invention.

The apparatus for carrying out the method according to the invention is illustrated in FIGS. 4 and 5. As shown in FIGS. 4 and 4a, the rolling path elements 20a and 20b are connected to supporting collars 21a and 21b which, in turn, are attached to opposite ends of the gear shaft. Rolling path elements 20a and 20b each define slots 20c and 20d, respectively through which slots screw or bolts 22 extend and threadingly engage the respective supporting collars. The screws and slots allow the rolling path elements 20a and 20b to be laterally adjustable with respect to the respective supporting collars 21a and 21b.

As shown in FIG. 4a, the supporting collars 21a and nuts 24 which are threadingly engaged with an external surface of the supporting collars. Each of the nuts 24 has a radially extending stud 24a which engages a radially outwardly extending flange formed on the gear shaft.

Figure 5A:
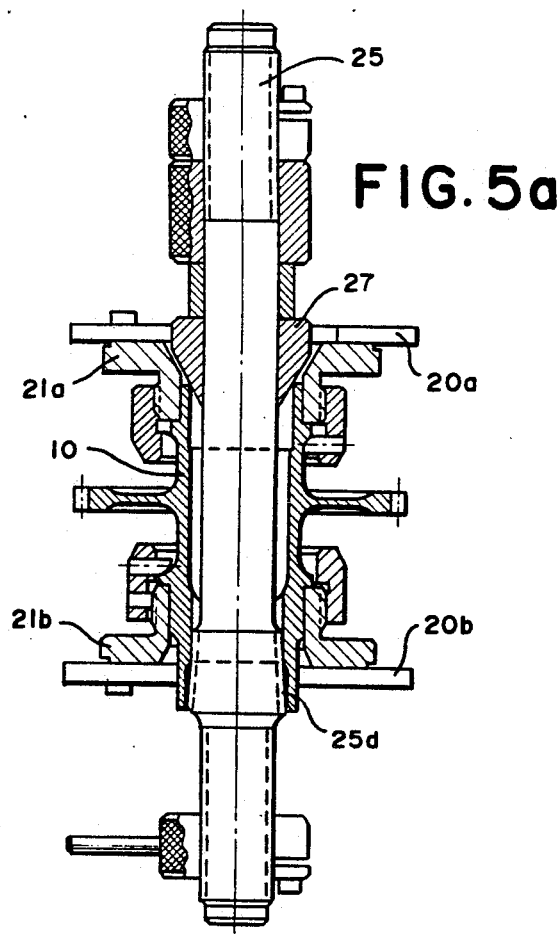

The second portion of the apparatus is illustrated in FIGS. 5 and 5a, and comprises a mandrel 25 that is insertable through the gear shaft 10. The mandrel 25 has a generally cylindrical shaft 25a with threaded portions at each end, illustrated at 25b and 25c. Mandrel 25 also has conical portion 25d. A drive means 26 is secured adjacent to one end of the mandrel shaft 25a and is screwed onto the threaded portion 25c. At the opposite end, a generally conically shaped, centering bridge element 27 is placed over the shaft 25a and is secured thereto by spacer 28, nut 29 and lock nut 30, both threadingly engaged with threaded portion 25b.

As best shown in FIG. 5a, the shaft 25a is inserted through the gear shaft 10 such that conical bearing portion 25d rests against the interior of one end of the gear shaft. Centering bridge element 27 is then urged into engagement with an interior portion of the opposite end of the gear shaft 10 by turning nut 29 on threaded portion 25b. Once in position, lock nut 30 prevents loosening of the centering bridge element 27.

Figure 6A:
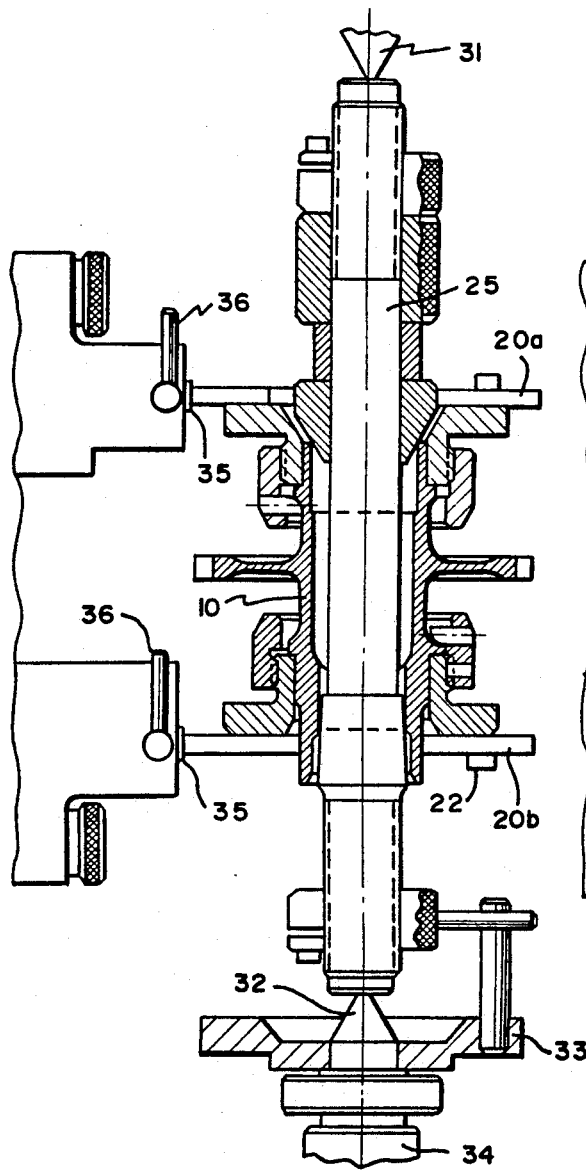
FIGS. 6a and 6b are schematic diagrams showing the installation of the assembly of FIG. 5a onto a rotating device to ascertain the reference axis.
Figure 6B:
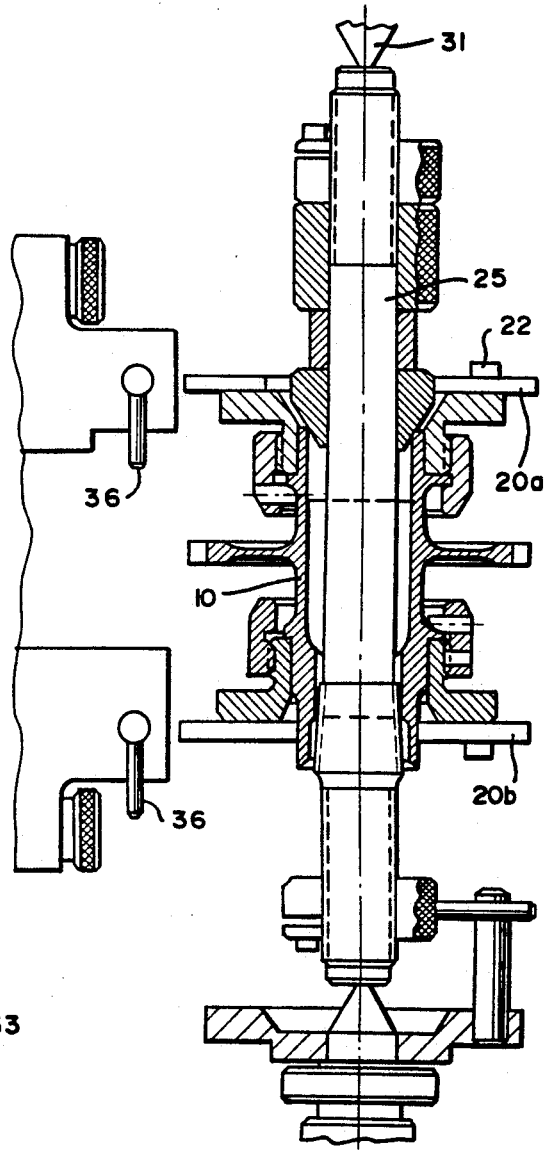

The assembly shown in FIG. 5a is installed in a rotating device, as illustrated in FIGS. 6a and 6b. The rotating device has opposing centers 31 and 32 engageable with the respective ends of mandrel 25. Drive plate 33, attached to chuck 34 operatively engages the drive means 26 attached to the mandrel 25 so as to rotate the assembly about the central longitudinal axis of mandrel 25.

The rotating device further comprises shoes 35 which may retract by operating levers 36 between the positions shown in FIG. 6a and those shown in 6b. In FIG. 6a, the shoes are extended so as to contact the outer peripheries of the respective rolling path elements 20a and 20b, while in FIG. 6b, the shoes are retracted so as to be out of contact therewith.

When the shoes are in their extended positions, rotation of the assembly will laterally adjust the positions of rolling path elements 20a and 20b such that their centers are coincident with the rotational axis of mandrel 25. When the shoes 35 are retracted, the lateral positions of the rolling path elements 20a and 20b may be adjusted to compensate for any offset or warpage of the gear shaft as previously determined. Once the rolling path elements have been suitably adjusted, they are rigidly attached to their respective supporting collars by screws 22.

Figure 7:
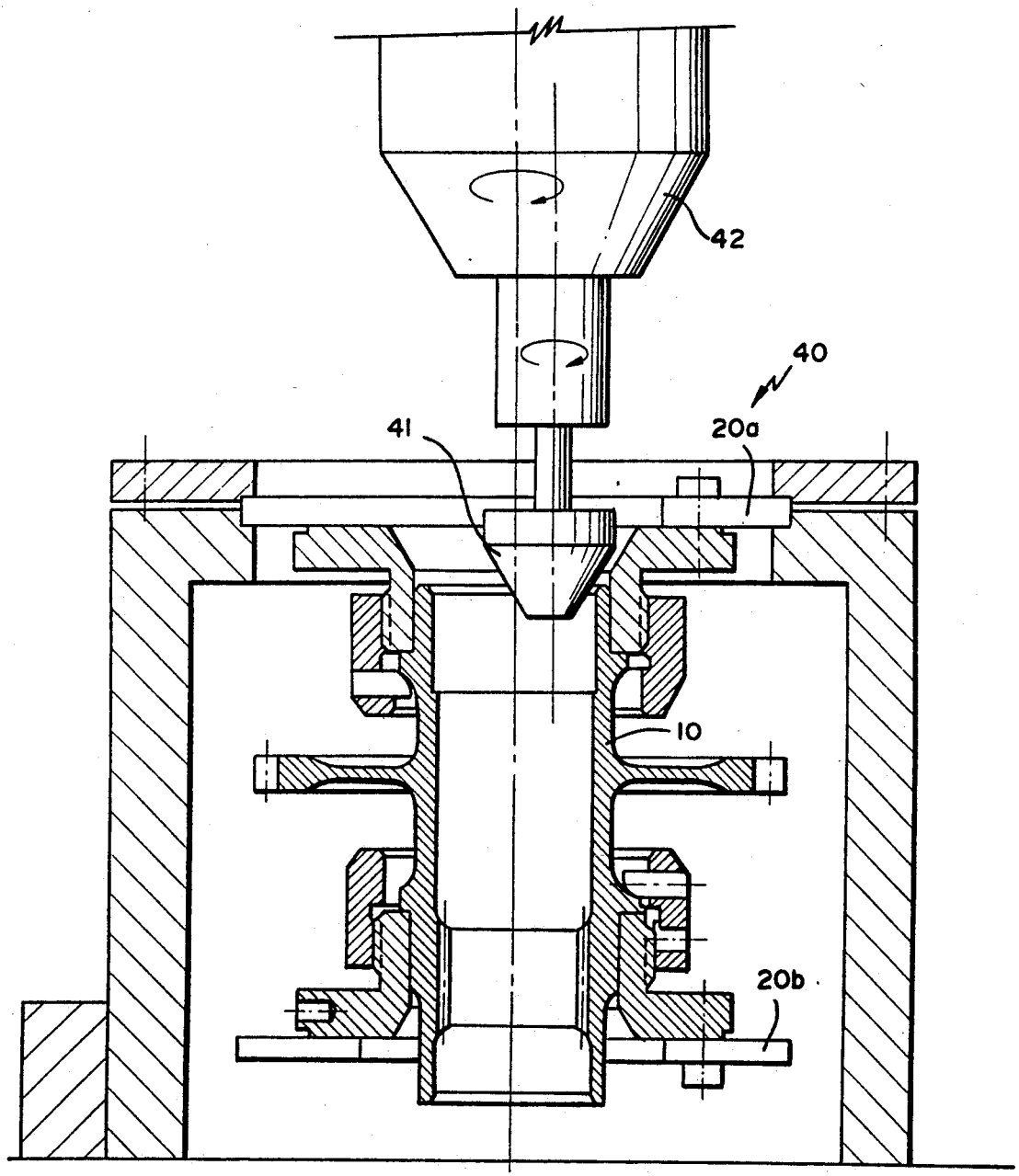
FIG. 7 is a cross sectional view of the gear shaft and the rolling path elements installed in a grinding machine.

At this point the assembly is removed from the rotating device and the mandrel 25 is withdrawn from the gear shaft. The gear shaft, with the rolling path members 20a and 20b rigidly attached thereto is placed in a grinding or dressing machine 40 as illustrated in FIG. 7.

The assembly is attached to the dressing machine by one of the rolling path elements, the centers of which now define the reference axis. The position of these elements with respect to the grinding wheel 41 driven by a connection to chuck 42 will enable the centering chamfers to be accurately formed with respect to the reference axis. The assembly in which the gear shaft and running path elements are mounted also may rotate about the reference axis to accurately form the centering chamfers. Once the centering chamfers have been accurately formed with respect to the reference axis, they can be used as centering devices to finish machine the remaining elements of the gear shaft.

The foregoing is provided for illustrative purposes only and should not be construed as in any way limiting this invention, the scope of which is defined solely by the appended claims.

We claim:

1. Apparatus for establishing a reference rotational axis for a gear shaft comprising:
   a) rolling path elements having centers;
   b) attachment means to attach a rolling path element to each end of the gear shaft comprising:
      i) support collars fixed attached to each end of the gear shaft;
      ii) a slot defined by each rolling path element; and,
      iv) a bolt extending through the slot and threadingly engaging a support collar to enable the position of each rolling path element to be adjusted with respect to the associated support collar;
   c) means to rotate the gear shaft comprising:
      i) a mandrel mounted in the gear shaft;
      ii) a center device engaging each end of the mandrel;
      iii) drive means to rotate the mandrel with respect to the center means about a reference axis; and
   d) means to adjust the positions of the rolling path elements relative to the gear shaft such that their centers coincide with the reference axis and to compensate for any offset or warp of the gear shift.

2. The apparatus according to claim 1 wherein each support collar is attached to the gear shaft by a nut engaging an exterior portion of the gear shaft and threadingly engaging a support collar.

3. The apparatus to claim 2 further comprising:
   a) a conical portion formed on the mandrel adapted to bear against a portion of the interior of the gear shaft;
   b) a generally conically shaped bridge element located on the mandrel and adapted to bear against an interior end portion of the gear shaft; and,
   c) means to fasten the bridge element to the mandrel.

* * * * *